Oct. 16, 1951  J. H. SHAPLEIGH  2,571,953
MANUFACTURE OF HYDROGEN
Filed Sept. 19, 1947
FIG.1
FIG.2
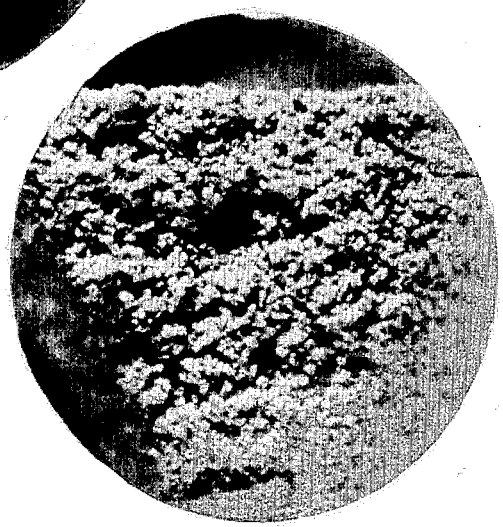
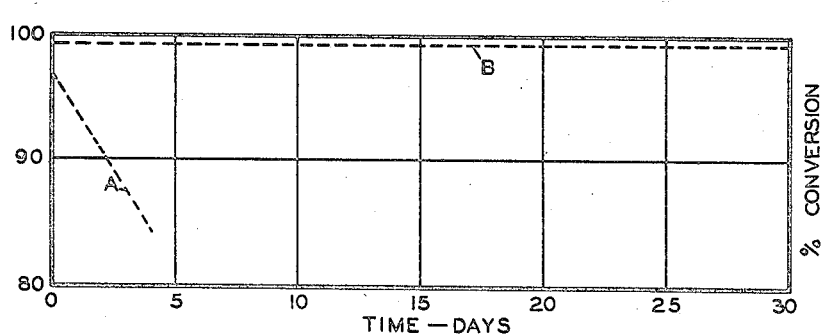
FIG. 3
JAMES H. SHAPLEIGH
INVENTOR.
BY  *Ernest G. Peterson*
AGENT Patented Oct. 16, 1951

2,571,953

UNITED STATES PATENT OFFICE 2,571,953

MANUFACTURE OF HYDROGEN

James H. Shapleigh, Wilmington, Del., assignor to Hercules Powder Company, Wilmington, Del., a corporation of Delaware Application September 19, 1947, Serial No. 774,907

2 Claims. (Cl. 23—212)

This invention relates to the art of catalysis, and more particularly to an improvement in the catalytic process for the manufacture of hydrogen from gaseous mixtures of steam and hydrocarbons.

The catalytic body of this invention comprises a catalyst and a carrier upon which the catalyst is supported. Many substances have been suggested as being useful as carriers for various types of catalysts for use in various chemical reactions. Substances suggested include glass wool, silica fibers, pumice, various porous-siliceous materials such as fire-clay, Alundum, unglazed porcelain, various forms of charcoal, silica gel, kieselguhr, quartz, starch, magnesium carbonate, kaolin, burned pyrite, zeolites, diaspore, various forms of cement, corundum, bauxite, graphite, fuller's earth, Japanese acid clay, various metals in various forms, etc. All of these carriers as heretofore known to and available in the art of catalysis are limited in one way or another in their degree of usefulness. Many of them are entirely unsatisfactory for prolonged use in systems employing high temperature conditions, i. e., between about 1100° F. and about 2400° F., these temperature conditions being the temperature of the catalyst body.

It has been observed that certain prior art carriers, as for example, random picked diaspore, pumice, bauxite and other aluminum-containing materials, are not suitable as a catalyst carrier when used in systems employing temperatures between about 1100° F. and about 2400° F. Whereas the prior art discloses the use of aluminum-containing materials as carriers in their natural state, the art has not taught that there is a problem of selection of a kind of particular material of each type or how to make such a selection in order to produce a catalyst of practical life.

It has been discovered that aluminum-containing materials in their natural state contain varying quantities of impurities which act as fluxes under application of high temperature and that the severity of the flux action upon catalytic action is dependent upon the type and amount of fluxing agents present and upon the temperature of use. For instance, samples of pumic have fluxed and seriously affected catalytic action at relatively low temperatures in the order of 1100° F.–1500° F., while samples of diaspore have shown this effect at temperatures in the order of 1300° F. and higher.

The identity of the fluxing agent and the effect of specific quantitative amounts is not known. Compounds of boron are suspected as being highly undesirable constituents. High alkali and iron content also are felt to be undesirable as being contributory to flux action, yet the art has not taught the avoidance of these materials or the extent to which they may be tolerated when present. It is believed that this lack of teaching is due to efforts over a long period to use low temperatures favorable to maximum $CO_2$ formation, to lack of suitable tubes for high temperature operation, and contentment with low efficiencies and capacities.

It will be appreciated that in the operation of processes using aluminum-containing materials in accordance with prior art practice that fluxing may occur. However, in view of the large amount of catalyst used and the heretofore ready acceptance of the inferior efficiencies and capacities obtained, the inadequacy of such processes is not readily realized until the processes are compared to the process of the present invention. For example, diaspore, pumice, bauxite and the like have long been taught as suitable materials to be utilized as a catalyst carrier. Yet a sample of diaspore impregnated with catalyst dropped in efficiency from 97.5% to 85.0% in 4 days when employed in a process operated within the temperature range disclosed in this invention. In comparison therewith, a selected diaspore impregnated with catalyst and employed in accordance with the process of this invention gave no appreciable drop in efficiency during 6 months of use.

Thus, it has been discovered that aluminum-containing materials selected in accordance with this invention and employed in accordance with the process of this invention give beneficial results heretofore unobtainable when using aluminum-containing materials as disclosed in accordance with the prior art. It is believed that the dehydrogenation catalyst, as for example, a nickel catalyst, forms a complex with certain components of the carrier at elevated temperatures. The formation of this complex appreciably reduces the activity of the catalyst and its activity is progressively reduced as the operating temperature for the catalyst is increased. This condition may be quite evident in systems operated at temperatures above 1100° F.

Now in accordance with the present invention, it has been discovered that from natural-occurring minerals containing aluminum, such as diaspore, bauxite, pumice, etc., which as composites, singly or in combination, contain undesirable fluxing components in kind and quantity, selected lumps, or batches may be obtained with confidence by a method hereinafter described which when used as catalyst carriers, will give long life at high efficiency. These carriers may be combined with a dehydrogenation catalyst and utilized in systems employing high temperatures without substantial reduction of catalytic activity over long periods of operation.

More particularly, it has been discovered that the new catalytic body of this invention comprising either a calcined or a natural-occurring selective mineral containing aluminum impregnated with a dehydrogenation catalyst, as for example, a nickel catalyst, may be effectively used in the production of hydrogen from a gaseous mixture of steam and a hydrocarbon operated under temperatures as high as 2400° F.

As an alternative procedure, the catalytic body of this invention may be prepared by first reducing the carrier material to any suitable and convenient size, as for example, a size which will pass through a screen having a mesh from about 5 to about 100 and preferably 20, and then treating as by mixing the screened material with a dehydrogenation catalyst-forming material, as for example, nickel nitrate or nickel hydroxide, to form a paste which may then be processed by methods known to the art and formed into any suitable shape, as for example, pellets. The mineral may be calcined before or after reduction in size, or after it has been formed into any desired shape. The compact thus formed may be composed entirely of the catalytic body of this invention or it may contain other chemical compounds mixed therewith such as inert materials or promoters.

In identifying a selective mineral containing aluminum, it will be appreciated that it is seldom pure as quarried, the deposits varying considerably in composition even in the same quarry. The intimate mixture of minerals in the average material, the frequently complex chemical nature of minerals, and the usual smallness of the individual grains make their identification difficult. For example, microscopic analysis and spectrographic analysis were utilized in attempting to ascertain what caused one such mineral of the present invention, specifically diaspore, to give the greatly improved results obtained. Nothing conclusive was obtained from these analyses. Chemical analysis of the diaspore, likewise, was inadequate since it did not reveal how the various constituents found in the analysis are combined with each other.

However, chemical analysis of the diaspore did show that the material was predominantly alumina ($Al_2O_3$) with silica ($SiO_2$) being present in varying amounts of from about 3 to 20% by weight of the calcined diaspore. Spectrographic analysis of a selective mineral of this invention as well as other similar but unsuitable diaspores revealed the following constituents:

Boron—trace
Phosphorus—trace
Aluminum—major
Magnesium—minor
Manganese—trace
Lead—trace
Silicon—major
Nickel—trace
Iron—major
Chromium—trace
Tin—trace
Calcium—trace
Titanium—major
Copper—trace
Sodium—trace The typically complex nature of diaspore, as indicated above, made it impossible to define a selective mineral of the present invention in terms of exact chemical composition. Moreover, it was realized that other important influences, such as grain size and state of oxidation of the various constituents affected the functioning of the material at high temperatures. Consequently, a procedure was devised for determining a selective mineral of this invention from unsuitable minerals even as obtained from the same deposit. The procedure utilizes pyrometric cones and is described in the following example when using diaspore as a selective mineral for a process according to the invention.

Samples of diaspore are ground in a pulverizer and sieved. The portion passing through a 200-mesh sieve but retained on a 325-mesh sieve is used. The prepared catalysts are made up by impregnating the ground diaspore with nickel nitrate solution and then dried and ignited. Cones are made from the prepared catalysts. The cones are made by moistening a sieved sample of the catalyst with a 10% dextrin solution, the plastic mass is then molded into triangular cones (pyramids) ¾ inch in height and ¼ inch in width at the side of the base, using a steel mold. After drying at 212° F., the cones are mounted in an Alundum cement. This assembly is dried at 212° F., and then heated to 1650° F. for 30 minutes. Following this treatment, the cones are heated for one-hour periods at temperatures ranging from 1800° F. upwards to temperatures about 400° F. above the temperature at which the catalyst is to be used, in a mildly reducing atmosphere using a high temperature furnace. The cones are prepared for microscopical examination by breaking off the top one-third of the cone. The broken surface is then examined with a 60× stereoscopic microscope using inclined illumination from above the specimen. For each sample a series of cones heated to different temperatures are examined. The condition of the surface of the individual diaspore particles is noted as being not vitrified, slightly vitrified, or vitrified.

If the microscopical analysis reveals that the diaspore sample is not vitrified, it is suitable as a selective mineral in accordance with this invention. However, since some surface vitrification of individual grains may or may not be detected by 60× or higher powered microscope, as evidenced by surface luster, positive vitrification is here defined in a practical sense to distinguish between satisfactory and unsatisfactory catalyst carrier. With unsatisfactory carrier material, it will be observed that vitrification is marked, the grains being tighter together and the flow of flux material being much in evidence. With satisfactory carrier material, it will be observed that the physical condition of the catalyst carrier is entirely different. The voids between the grains are deep and the porous structure of the carrier has not been impaired, thereby clearly showing an absence of vitrification.

For practical purposes, the procedure as outlined above is carried out on the raw mineral, that is, without addition of the catalyst material. The condition of the surface of the samples is noted in the same manner as when the catalyst is present and its suitability is determined as explained above.

Reference is now made to the accompanying drawing in which Fig. 1 is a photomicrograph of a raw diaspore sample showing vitrification and Fig. 2 is a photomicrograph of a raw diaspore sample showing absence of vitrification. The two samples were heated for one hour at 2400° F. in a mildly reducing atmosphere and the photomicrographs were taken with a magnification of 30X. The diaspore of Fig. 1 is unsuitable as the glassy appearance of its surface clearly shows that it is considerably vitrified. On the other hand, the diaspore of Fig. 2 shows that it is entirely satisfactory for use in accordance with this invention since it shows an absence of vitrification as hereinbefore described.

In the art of cracking hydrocarbons, it will be appreciated that the maximum catalyst temperature used for a particular system may vary from that of another. For example, one operation might be conducted at 1200° F., another at 1600° F., and still another at 2400° F. A catalyst carrier which is nonvitreous at 1200° F. may be sufficiently vitreous at 1600° F. to cause a falling off in cracking efficiency. This may be seen by reference to Fig. 3 of the drawing, in which the line "A" shows the cracking efficiency obtained when using a vitreous diaspore carrier and the line "B" shows the cracking efficiency when utilizing a nonvitreous diaspore carrier. When relatively poor cracking of hydrocarbons is permissible, i. e., in the order of 90% or less, the low temperatures allowable may permit the use of a vitreous diaspore carrier; i. e., a carrier which at higher temperatures would have sufficient vitrification and flow quality such as to render the catalyst less efficient. However, when quality cracking efficiency is to be obtained, i. e., in the order of 0.1% to 0.4% $CH_4$, in the exit gas or when normally liquid hydrocarbons containing sulfur are used as raw material, the vitreous-type catalyst has been found to be unsuitable, whereas the nonvitrifying type, in accordance with this invention, has been found to be highly satisfactory. For example, a mixture of steam and methane was passed at a temperature of about 1600° F. through a catalyst mass comprising a nickel catalytic body in which an ordinary diaspore was utilized as the carrier material and for comparison a selective mineral in accordance with this invention also was utilized. The per cent conversion obtained under comparable conditions was 97.5 at the start and 85.5 for the ordinary diaspore at the end of the four days of operation in contrast to 99.2 at the start and 99.2 for the selective mineral at the end of 30 days of operation. These results are graphically illustrated by lines "A" and "B", respectively in Fig. 3. It has been found that in accordance with this invention cracking efficiencies are substantially uniform over long periods of operation, i. e., they do not vary more than 2% within 30 days of operation.

For example, the selective mineral of the diaspore group that has been discovered as being a suitable catalyst carrier may be generally described as containing a certain percentage of silica ($SiO_2$) and alumina and iron oxide ($R_2O_3$) in which the following table discloses the data obtained from an analysis of six separate calcined samples of the mineral taken from the same geographical area:

TABLE I

| Sample | 1 | 2 | 3 | 4 | 5 | 6 |
| --- | --- | --- | --- | --- | --- | --- |
| | Per cent | Per cent | Per cent | Per cent | Per cent | Per cent |
| Silica ($SiO_2$) | 4.0 | 10.02 | 10.00 | 12.6 | 19.02 | 19.50 |
| Alumina and Iron Oxide ($R_2O_3$) | 96.0 | 89.98 | 90.00 | 87.4 | 80.98 | 80.50 |

The first sample is a high grade material, the next three samples are a normal grade material, and the last two samples are of a tolerable grade material insofar as chemical analysis is concerned and provided no appreciable variation exists within the sample. However, each of the foregoing samples must pass the aforedescribed vitrification test in order to be utilized in accordance with this invention. Each of the samples had a porosity of about 36% in its natural condition. This percentage of porosity may be increased by a calcination operation and the effect of higher temperatures on the per cent of porosity is set out in the table below.

TABLE II

| Temperature | Porosity |
| --- | --- |
| °C. | Per cent |
| Natural | 36.00 |
| 400 | 36.85 |
| 600 | 39.75 |
| 800 | 40.50 |
| 1,000 | 40.51 |
| 1,200 | 40.82 |

The selective mineral for the catalytic body of this invention may be utilized either in a calcined or a natural-occuring state. When used in a calcined state the porosity of the material is increased and this increased porosity permits a greater degree of impregnation of the mineral with the dehydrogenation catalyst.

Results of microscopical examination of diaspore pyrometric cones after heating at various temperatures is given in Table III. Samples 7 through 11 were raw diaspore while samples 12 through 14 were catalytic bodies impregnated with nickel. The samples of catalytic bodies 12, 13, and 14 employed the raw diaspore of samples 7, 8, and 9 respectively.

TABLE III

*Results of microscopical examination of diaspore pyrometric cones after heating at various temperatures*

| Designation | Heated for 1 hour at— | | | | | | | |
| --- | --- | --- | --- | --- | --- | --- | --- | --- |
| | 500° F. | 1800° F. | 1900° F. | 2000° F. | 2100° F. | 2200° F. | 2300° F. | 2400° F. |
| Sample 7 | N. V. | S. V. | V. | V. | | V. | | V. |
| Sample 8 | | | N. V. | S. V. | V. | | | V. |
| Sample 9 | N. V. | | N. V. | N. V. | N. V. | N. V. | N. V. | N. V. |
| Sample 10 | | | | N. V. | | N. V. | | N. V. |
| Sample 11 | N. V. | | N. V. | | | S. V. | | S. V. |
| Sample 12 | | S. V. | V. | V. | V. | | | |
| Sample 13 | | | | S. V. | V. | V. | | |
| Sample 14 | | | | N. V. | N. V. | N. V. | N. V. | N. V. |

Samples were examined with a stereoscopic microscope at 30 and 60X.
V.=Surface of individual particles vitrified or fused.
S. V.=Surface of individual particles slightly vitrified or fused.
N. V.=No vitrification or fusion detected on particles.

With reference to the above table, it will be seen that the raw materials of samples 9 and 10 and the catalytic body of sample 14 are satisfactory for use in systems in which the catalyst temperature is as high as 2000° F. A catalytic body prepared with the raw material of sample 10 would, likewise, be satisfactory at this high temperature. In a system in which the catalyst temperature does not exceed 1500° F., the material of sample 8 would be suitable, etc. Thus, the mineral utilized in accordance with this invention is defined as a selective mineral containing aluminum and "characterized by having an insufficient amount of vitrifiable material present to substantially reduce the activity of the catalytic body." Moreover, the term "a selective mineral containing aluminum" is meant to include within the purview of this invention blends of minerals as well as individual minerals in the natural or calcined state such as aluminum hydroxide, hydrous aluminum oxide, and the silicates of aluminum, sodium, potassium, commonly known as bauxite, diaspore, and pumice, respectively.

Although it is not intended that the invention shall be limited to any particular theory of operation, it appears that certain combinations of the constituents of aluminum-containing materials cause fluxing at high temperatures. This flux having a liquid characteristic "wets out" or flows over the catalyst particles thereby diminishing the contact surface. When the contact surface is diminished the catalytic activity is impaired or reduced. Moreover, the melting point of a particular material is by no means a criterion of its suitability, since the catalytic body must be capable of supporting the load of the catalytic body disposed thereabove. For example, it is well known in the field of refractories that commercial magnesite has a melting point of over 2000° C.; yet it will not carry a load at temperatures over 1400° C. On the other hand a mullite brick which has a melting point of 1780° C. will carry a load up to 1730° C. Thus, it appears that this latter anomaly also plays some part in making possible the unusual results obtained in accordance with the present invention.

The present invention finds particularly suitable adaptation in the process disclosed in my U. S. Patent Re. 21,521 as well as other systems where the temperature of the catalytic body is maintained from about 1100° F. to about 2400° F. The following examples disclose specific embodiments of the use of this invention in a process for the production of hydrogen from a gaseous mixture of hydrocarbons and steam:

EXAMPLE I

A 1.8 to 1 mixture of steam and methane, respectively, was passed through a catalyst mass comprising nickel catalyst supported on a diaspore carrier selected in accordance with the invention, at a temperature of about 1400° F.-1600° F. to produce a 99.2% conversion of methane to gaseous products, based upon the amount of methane introduced. The cracking efficiency was substantially uniform at the end of 30 days and was within 1% of initial conversion at the end of 6 months.

EXAMPLE II

A 1.8 to 1 mixture of steam and methane, respectively, was passed through a catalyst mass comprising nickel catalyst supported on pumice selected in accordance with this invention, at a temperature of about 1300° F.-1350° F. to produce 95.5% conversion of the hydrocarbon to gaseous products and this conversion was within 0.5% of initial conversion at the end of 30 days.

In general, any of the dehydrogenation catalysts conventionally used may be employed in the present invention, it being understood, of course, that the particular catalyst utilized should have a melting point higher than the operating temperature of the catalyst for a given system. Metals or oxides of metals, such as nickel, cobalt, chromium, or other high melting point catalysts are suitable. Nickel is the preferred catalyst for the manufacture of hydrogen from gaseous mixtures of steam and hydrocarbons.

In view of the foregoing description, it is apparent that the present invention is an important improvement to high temperature catalytic processes for the dehydrogenation of hydrocarbons.

This application is a continuation-in-part of my now abandoned application Serial No. 536,981, filed May 23, 1944.

What I claim and desire to protect by Letters Patent is:

1. In the catalytic process for manufacturing hydrogen from steam and hydrocarbon, the improvement which comprises passing a gaseous mixture of steam and hydrocarbon over a catalytic body maintained at a temperature of from about 1100° F. to about 2400° F., said catalytic body comprising a dehydrogenation catalyst in association with a calcined, naturally occurring mineral carrier, at least 80% of the calcined carrier being alumina and iron oxide and the remainder being substantially completely composed of silica said carrier being substantially free from materials vitrifiable at temperatures below 2400° F.

2. In the catalytic process for manufacturing hydrogen from steam and hydrocarbon, the improvement which comprises passing a gaseous mixture of steam and hydrocarbon over a catalytic body maintained at a temperature of from about 1100° F. to about 2400° F., said catalytic body comprising a nickel-impregnated, calcined, naturally occurring mineral carrier, at least 80% of the calcined carrier being alumina and iron oxide and the remainder being substantially completely composed of silica said carrier being substantially free from materials vitrifiable at temperatures below 2400° F.

JAMES H. SHAPLEIGH.

REFERENCES CITED

The following references are of record in the file of this patent:

UNITED STATES PATENTS

| Number | Name | Date |
|---|---|---|
| 2,173,984 | Shapleigh | Sept. 26, 1939 |
| 2,292,570 | Klemm et al. | Aug. 11, 1942 |